(12) United States Patent
Brindle et al.

(10) Patent No.: US 8,068,504 B2
(45) Date of Patent: Nov. 29, 2011

(54) ONE-WAY ROUTER

(75) Inventors: Joshua J. Brindle, Columbia, MD (US); Charles D. Sellers, Columbia, MD (US)

(73) Assignee: Tresys Technology, LLC, Columbia, MD (US)

( * ) Notice: Subject to any disclaimer, the term of this patent is extended or adjusted under 35 U.S.C. 154(b) by 239 days.

(21) Appl. No.: 12/467,665

(22) Filed: May 18, 2009

(65) Prior Publication Data

US 2010/0290476 A1  Nov. 18, 2010

(51) Int. Cl.
*H04L 12/28* (2006.01)
*G06F 15/173* (2006.01)

(52) U.S. Cl. .......................... 370/401; 709/225; 709/238

(58) Field of Classification Search .................. None
See application file for complete search history.

(56) References Cited

U.S. PATENT DOCUMENTS 6,108,787 A *  8/2000  Anderson et al. ................. 726/5
6,718,385 B1 *  4/2004  Baker et al. .................... 709/225
2008/0301799 A1 * 12/2008  Arnold et al. ................... 726/14
2009/0055934 A1 *  2/2009  Jauer .............................. 726/26
2010/0257353 A1 * 10/2010  Cheng ........................... 713/153

* cited by examiner

*Primary Examiner* — Gregory Sefcheck
*Assistant Examiner* — Otis L Thompson, Jr.
(74) *Attorney, Agent, or Firm* — Sterne, Kessler, Goldstein & Fox, P.L.L.C

(57) ABSTRACT

A one-way router combines benefits of a network diode and router, and thus can route data between networks of varying confidentiality and/or integrity in a secure, one-way fashion. Secure routing is provided transparently so that the router is compatible with standard network applications by synthesizing responses for standard network protocols to provide many-to-many network connections while preventing bidirectional data flow. Separate network stacks are provided for each connected network, and the network stacks are separated from each other by data diodes that enforce one-way data flow. The one-way router can be implemented in hardware or software, and provides architectural flexibility to customize levels of assurance, performance, reliability, and cost.

20 Claims, 6 Drawing Sheets

ONE-WAY ROUTER

BACKGROUND

1. Field of Invention

The present invention is generally directed to routing network traffic. More particularly, it is directed to transparently routing network traffic across networks in a unidirectional fashion.

2. Description of Related Art

Many standard network protocols, e.g., FTP, require bidirectional communication to function properly. Even unidirectional data transfers require bidirectional communication at the protocol level for these standard network protocols. However, various protected environments, such as power plants, secure government facilities, and Supervisory Control And Data Acquisition (SCADA) environments, for security and other reason may need to pass outbound data, while preventing and/or limiting inbound data. A similar need to control network traffic exists networks communicating classified data. For example, there may be a need to allow lower classification data to pass from a user having a "confidential" clearance level to a user having a "secret" clearance level while at the same time preventing higher classification data from passing from a "secret" clearance level user to a "confidential" clearance level user.

Conventional unidirectional networks, utilizing data diodes and data pumps, can enable one-way flow of data to provide some measure of security, but are expensive and cumbersome to deploy, manage, and use because of overhead associated with implementing and managing such networks. For example, transferring data over a conventional data diode network requires custom developed servers and/or custom protocols to be developed to accompany the conventional data diode, the custom servers usually placed on either side of the conventional data diode. Additional training for users is required to accommodate use of the custom servers interacting with the conventional data diodes, typically requiring manual user intervention on each side of the conventional data diode. Furthermore, data diodes do not provide network routing, and are therefore limited only to point-to-point data transfer.

Data Pumps require development and use of custom wrappers for each protocol, and are limited to point-to-point communication (e.g., a custom system is required to be attached to each side of the data pump). Point-to-point unidirectional networks require custom client and server software. Consequently, new techniques are required for providing secure transparent unidirectional routing of network traffic using standard network protocols.

BRIEF SUMMARY OF THE INVENTION

The invention is defined by the claims of this patent and is explained by various embodiments described in below. It relates in general to providing transparent one-way network traffic routing, and applications thereof. An embodiment of the invention provides a method for routing network traffic using a one-way router. Network traffic is received from one or more network traffic sources. One or more source sessions with the network traffic sources are established, and one or more synthetic destination application responses are selectively transmitted to the network traffic sources via the source sessions. Network traffic is transmitted through one or more one-way data diodes. Each data diode corresponds to one or more source sessions. One or more destination sessions are established with one or more network traffic destinations. Each destination session is isolated from the source sessions by a corresponding one-way data diode. Network traffic is transmitted from the one-way data diodes to the network traffic destinations via the destination sessions, and destination responses are received from the network traffic destinations responsive to the network traffic. Synthetic source application responses are selectively transmitted to the network traffic destinations.

Another embodiment of the invention describes a receiver configured to receive and process network traffic from one or more network traffic sources. The receiver includes one or more transport destination synthesizers configured to selectively generate one or more synthetic destination transport responses. The embodiment further includes one or more application destination synthesizers configured to receive the network traffic from the receiver and selectively transmit to the receiver synthetic destination application responses. The receiver is configured to transmit the synthetic destination application responses to the network traffic sources. One or more data diodes are each coupled to a corresponding application destination synthesizer and are configured to selectively provide one-way passage of the network traffic from a corresponding application destination synthesizer. One or more application source synthesizers correspond to the one or more application destination synthesizers. Each of the one or more application source synthesizers is coupled to a corresponding data diode and is configured to receive network traffic from the data diode. A sender is configured to receive the network traffic from the one or more application source synthesizers. The sender includes one or more transport source synthesizers configured to selectively generate one or more synthetic source transport responses. The sender is further configured to transmit synthetic source transport responses to network traffic destinations, receive destination responses from the corresponding network traffic destinations, and transmit destination responses to the application source synthesizers. The application source synthesizers are further configured to selectively generate and transmit, to the sender, synthetic source application responses. The sender is further configured to transmit, to the corresponding network traffic destinations, network traffic and the synthetic source application responses from the source synthesizers.

Another embodiment of the invention describes a tangible computer-readable medium having stored thereon, computer-executable instructions that, if executed by a computing device, cause the computing device to perform a method for routing network traffic using a one-way router. The method includes receiving network traffic from network traffic sources, and selectively transmitting synthetic destination transport responses and synthetic destination application responses to the network traffic sources, responsive to the network traffic. The method further includes selectively transmitting synthetic source transport responses to network traffic destinations, transmitting the network traffic through one-way data diodes to the network traffic destinations, receiving destination responses from the network traffic destinations, responsive to the network traffic, and selectively transmitting synthetic source application responses to the network traffic destinations.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain principles of the invention and to enable a person skilled in the relevant art(s) to make and use the invention.

FIG. 1 is a schematic diagram of a network arrangement including a one-way router 100, according to the invention, that provides communication between multiple networks 102, 104, 106, and 108.

Figure 1:
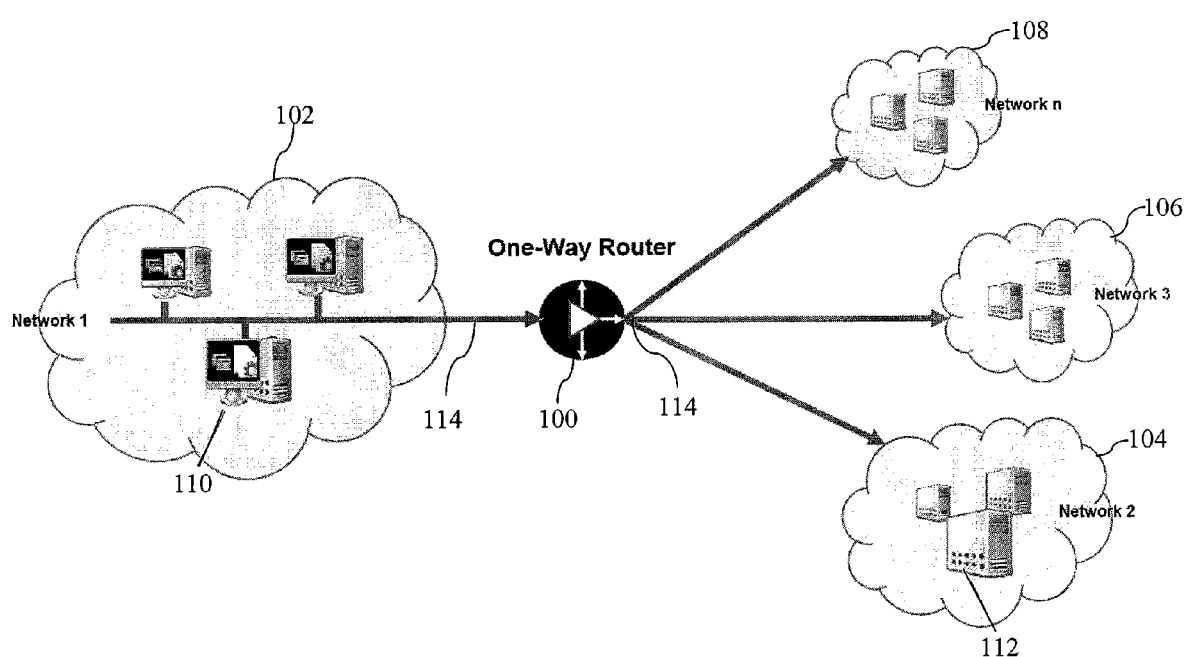

Features and advantages of the invention will become more apparent from the detailed description set forth below when read in conjunction with the drawings. In the drawings, like reference numbers generally indicate identical, functionally similar, and/or structurally similar elements. In most cases, the drawing in which an element first appears is indicated by the leftmost digit(s) in the corresponding reference number.

DETAILED DESCRIPTION

Embodiments of the one-way router enable secure, transparent, one-way network information flow, and enable one-way flow of information across network boundaries without compromising the integrity or confidentiality of the networks. Routing is provided transparently, allowing compatibility with standard network applications without a need for modification or custom configuration.

FIG. 1 is a schematic diagram of a network arrangement including a one-way router 100, according to the invention, that provides communication between multiple networks 102, 104, 106, and 108, for example, although additional networks are contemplated. Each of the networks 102, 104, 106, and 108 can include multiple network traffic sources 110 and network traffic destinations 112. The one-way router 100 can be configured to allow commodity network traffic sources 110 and destinations 112, implementing standard protocols, to be routed across networks 102, 104, 106, and 108 of differing sensitivity or integrity in a unidirectional fashion. The one-way router 100 can allow the use of unmodified standard client and server software by sitting in-between and providing each end with the expected network traffic via network traffic paths 114 (ACKs, etc).

One-way router 100 can provide many operational advantages and benefits. For example, it can serve as a one-way routing guard by strongly enforcing unidirectional network flow while transparently routing between networks. One-way router 100 does not require custom clients or servers, because it is transparent, for example, from network to application layers in a TCP/IP stack. By synthesizing responses for standard protocols like TCP, FTP, or HTTP, the one-way router 100 allows unmodified clients and servers to function, without allowing bi-directional data flow between the clients and servers. The one-way router 100 is configurable to be user and network traffic transparent because user workflow can be completely standard. A user can connect, using familiar applications, through the one-way router 100 directly to a server. Network traffic 114 flows across the one-way router 100 transparently without the need for special configuration of systems on either side of the one-way router 100.

Further, the one-way router 100 enables many-to-many transfers because the one-way router 100 includes the functionality of a network router. Thus, it is possible for many network traffic sources 110 to connect to many network traffic destinations 112, through multiple networks 102, 104, 106, and 108. The one-way router 100 can be configured such that it can accommodate new clients or servers as they are added to the networks 102, 104, 106, and 108, as the one-way router 100 provides the benefits of a network diode and a router.

Figure 2:
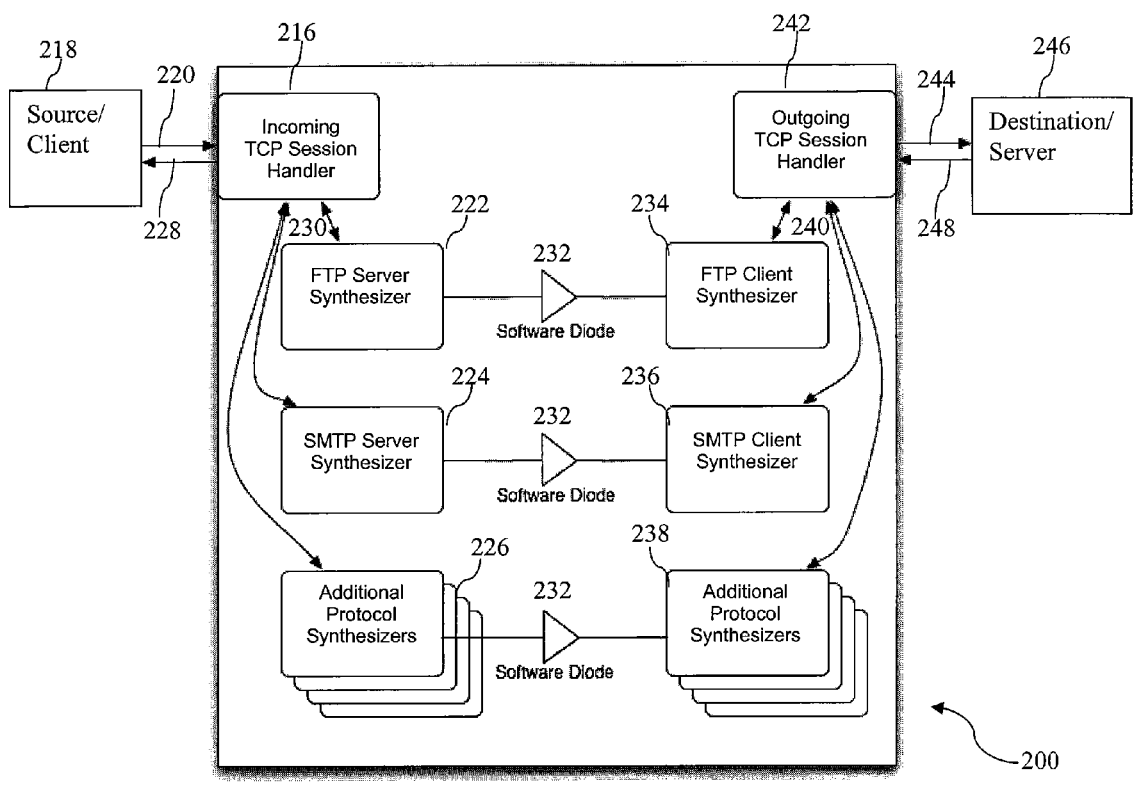
FIG. 2 illustrates an internal architecture of an embodiment of a one-way router.

FIG. 2 is a schematic diagram of an internal architecture of an embodiment of a one-way router 200. The one-way router 200 can act as a server to connected clients, and can act as a client to connected servers, by implementing multiple network stacks in the one-way router 200, one network stack for each connected network. As illustrated in FIG. 2, the one-way router 200 can connect two networks of differing confidentiality and/or integrity using two network stacks, and route data between them in a secure, one-way fashion through data diodes 232. As illustrated in FIG. 1, the one-way router 100 can connect four networks 102, 104, 106, and 108 by implementing four network stacks, one for each of the networks 102, 104, 106, and 108. The use of additional network stacks, to accommodate additional networks, is contemplated.

The custom designed network stacks include, for example on the source side of the one-way router 200, an incoming TCP session handler 216, and various associated server synthesizers including a FTP server synthesizer 222, a SMTP server synthesizer 224, and additional protocol synthesizers 226. The outgoing TCP session handler 242 and client synthesizers including a FTP client synthesizer 234, a SMTP client synthesizer 236, and additional protocol synthesizers 238 correspond to a network stack on the destination side of the one-way router 200. The network stacks are separated from each other by data diodes 232, and provide standard networking functions while preventing bidirectional data transfer. Although software diodes, such as software diode 232, are illustrated, hardware diodes can be used. The network stacks, which are completely separate for each connected network, provide standard network data transfer functions while utilizing the unique protocol synthesizers to allow commodity clients and servers to function in enforcing one-way data flow. Each network stack listens on its own network interface, each network stack being bound to physically separate network interfaces. The separate network stacks may be run in separate processes, for example where SELinux policy is implemented, as set forth below, and therefore the separate network stacks cannot talk to each other except through the protocol synthesizers via the data diodes 232.

Incoming TCP session handler 216 is configured to establish a connection with and receive inbound data packets from source/client 218 via data path 220. Data is processed by the incoming TCP session handler 216 and passed to the server synthesizers 222, 224, and 226 via source data routes 230. The incoming TCP session handler 216 and the server synthesizers 222, 224, and 226 synthesize responses to the source/client 218 formatted as though the responses originate from the destination/server 246, as described in further detail below. The data is passed through the data diodes 232 to corresponding client synthesizers 234, 236, and 238. A data path 244 provides connection with the destination/server 246 which connection is established by the outgoing TCP session handler 242. The outgoing TCP session handler 242 and client synthesizers 234, 236, and 238 transmit the data from the data diodes 232 to the destination/server 246 via the destination data routes 240 and the data path 244. The outgoing TCP session handler 242 and client synthesizers 234, 236, and 238 are configured to receive responses from the destination/server 246 via a data path 248, and synthesize corresponding synthesized responses formatted as though the synthesized responses originate from the source/client 218, as described in further detail below.

The protocol synthesizers 222, 224, 226, 234, 236, and 238 enable support of various standard protocols. For example, one-way router 200 includes FTP server synthesizer 222 and associated FTP client synthesizer 234, such that the one-way router 200 can support FTP traffic by which an FTP client, e.g., source/client 218, on one network can transfer a file to a server, e.g., destination/server 246, on another network through the one-way router 200. SMTP server synthesizer 224 and SMTP client synthesizer 236 are configured to support the SMTP protocol, as well as additional server/client protocol synthesizers 226/238 of various protocols.

The one-way router 200 provides the source/client 218 with the network traffic that spoofs the destination/server 246, generating simulated server responses for the source/client 218 without actually transferring data from the destination/server 246 to the source/client 218. The source/client 218 thus thinks it is talking to the destination/server 246, even though the responses from the destination/server 246 are prevented by the data diodes 232 from reaching the source/client 218. The one-way router 200 similarly connects to the destination/server 246 on the other network and passes the data to the destination/server 246, acting as the source/client 218 to the destination/server 246. The one-way router 200 thus generates synthetic protocol responses to satisfy source/clients 218 expecting server responses, and destination/servers 246 expecting client responses, without allowing bi-directional data transfer through the one-way router 200.

The one-way router 200 can be implemented in software. Embodiments can be constructed using Red Hat Enterprise Linux 5, the Tresys Certifiable Linux Integration Platform (CLIP), and SELinux. Together, these components provide unmatched security functionality, including flexible mandatory access control that enforces the core security properties of the one-way router 200. For example, the data diodes 232 can be implemented as software diodes, and SELinux can be used to enforce the software diodes and allow for flexible customization within the parameters of the SELinux operating system. The one-way router 200 may also be implemented on higher assurance operating system software, for example on an EAL7 evaluated separation kernel operating system, providing a higher assurance one-way router 200.

The software diodes can be implemented using the Secure Inter-Process Communication (SIPC) mechanism, for example, as disclosed in U.S. patent application Ser. No. 11/830,540, filed Jul. 30, 2007 and entitled "Secure Inter-Process Communications Using Mandatory Access Control Security Policies," the contents of which are hereby incorporated by reference in full. Components of the one-way router 200 are run in separate process spaces, and SIPC enforces the direction of data flow. Separate SELinux policies are used to bind the individual network stacks to their respective network interfaces with which the individual network stacks are allowed to communicate.

SIPC uses SELinux to provide uni-directional data transfer between processes, the SIPC channels enforcing the uni-directional flow of data between the network stacks on either side of the data diodes 232. The uni-directional flow is directly enforced by the SELinux-enhanced Linux kernel, providing the strongest security possible on a Linux system. This security is achieved without losing the excellent performance of the standard Linux Interprocess Communication (IPC) mechanisms.

The data diodes 232 can be implemented using alternative mechanisms, including other software implementations or hardware data diodes. Using two IP stacks around the data diodes 232 to synthesize communication with the source/client 218 and destination/server 246 can enable off-the-shelf products to be used on either end of the one-way router 200, while maintaining the unidirectionality of the data diodes 232.

The architectural flexibility of the one-way router 200 allows users to choose the required level of assurance, performance, reliability, and cost. Using software data diodes allows for great flexibility in controlling the type and scope of enforcement associated with the software data diodes. Safely co-locating both one-way network stacks on the same system allows, in an alternative embodiment, for the optional introduction of extremely low-bandwidth backflow error channels (not illustrated). These optional error channels can apply in situations where increased reliability is required and limited backflow is tolerable. These channels can be configured not to transfer any actual data from the destination-side to the source-side of the one-way router 200. The error channels can be configured to utilize a guarding function to safely propagate status from the destination-side protocol synthesizers to the source-side protocol synthesizers. For example, if authentication with the destination/server failed, the source-side protocol synthesizers could be notified via the error channels and generate a failure response to alert the client that authentication failed. However, in the illustrated embodiments, no backflow is allowed and strict one-way data flow is enforced.

Figure 3:
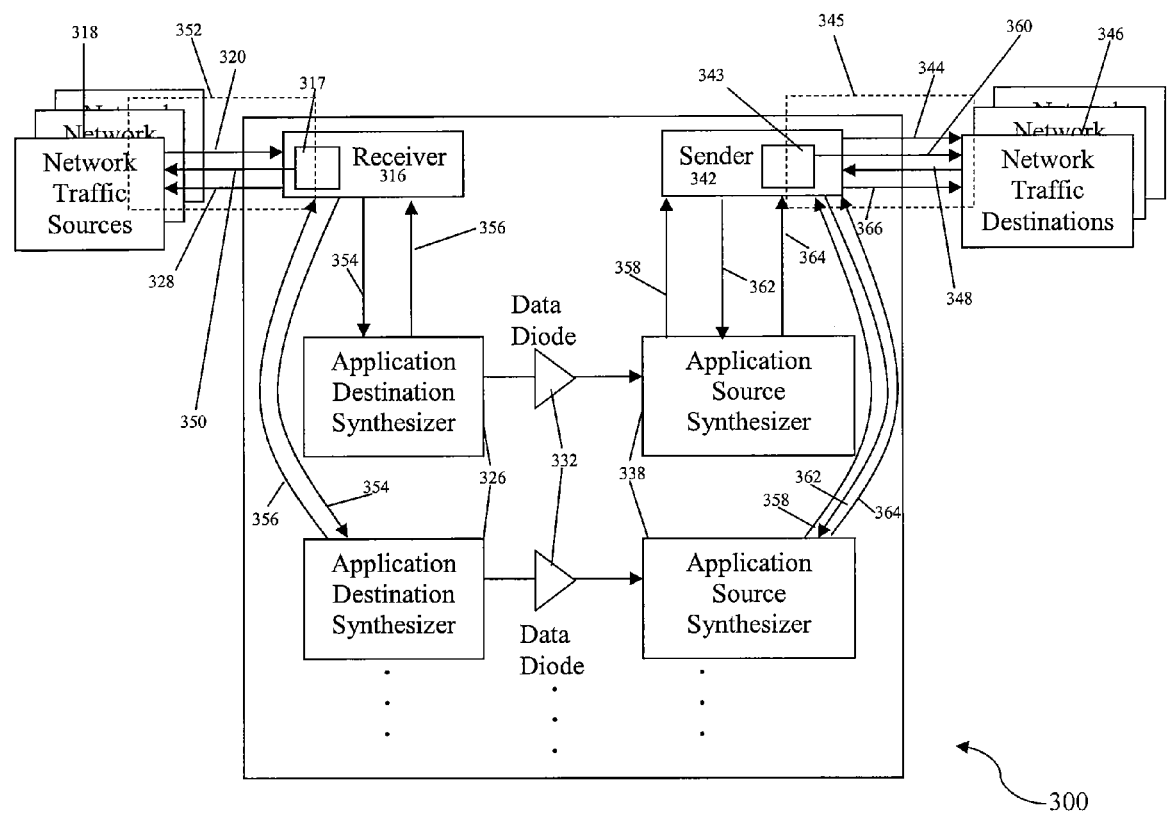
FIG. 3 illustrates a detailed view of an internal architecture of another embodiment of a one-way router.

FIG. 3 is a schematic diagram of an internal architecture and conceptual data pathways of another embodiment of a one-way router 300. Receiver 316 is configured to receive and process network traffic from network traffic sources 318 via a first network traffic path 320. The receiver 316 includes transport destination synthesizers 317, configured to selectively respond to a transport-layer of the network traffic via synthetic destination transport response path 350. Alternatively, the transport destination synthesizers can respond to a network-layer of the network traffic, and responsiveness to additional layers and/or protocols is contemplated. Responses from the transport destination synthesizers 317 are formatted as though originating from network traffic destinations 346, and establish a source session 352 corresponding to each of the network connections with each network traffic source 318.

The one-way router 300 includes application destination synthesizers 326 configured to receive the network traffic from the receiver 316 via second network traffic paths 354. The application destination synthesizers 326 are responsive to an application-layer of the network traffic, although responsiveness to additional layers and/or protocols is contemplated. For example, as illustrated in FIG. 2, application destination synthesizers 326 can include FTP-specific or SMTP-specific synthesizers, synthesizing application-layer responses accordingly. However, additional protocols can be supported, including common network protocols such as TCP, FTP, SFTP, HTTP, ICMP, SMTP, SCP, XMTP, streaming audio, streaming video, chat, jabber, and others. The application destination synthesizers 326 selectively transmit synthesized application-layer responses to the receiver 316, via first synthetic destination application response paths 356. The synthesized application-layer responses are formatted as though originating from the network traffic destinations 346. The receiver 316 transmits the synthesized application-layer responses to the network traffic sources 318 via second synthetic destination application response path 328.

Data diodes 332 are each coupled to a corresponding one of the application destination synthesizers 326. The data diodes 332 are configured to selectively provide one-way passage of the network traffic from the application destination synthesizers 326. As described above, the data diodes 332 can be implemented in hardware or software.

Application source synthesizers 338, corresponding to the application destination synthesizers 326, are coupled to the data diodes 332 to receive the network traffic from the data diodes 332. The application source synthesizers 338 transmit the network traffic to the sender 342 via the third network traffic paths 358. The sender 342 includes transport source synthesizers 343 configured to selectively generate and transmit, via synthetic source transport response path 360, a transport-layer response responsive to a transport-layer of the network traffic. Alternatively, the transport source synthesizers 343 can respond to a network-layer, or other layer, of the network traffic. The transport-layer response is formatted as though originating from the network traffic sources 318, establishing a destination session 345 corresponding to each of the network connections with each network traffic destination 346.

The sender 342 is further configured to receive destination responses from the corresponding network traffic destinations 346 via first destination response path 348. The sender 342 selectively transmits the destination responses to the application source synthesizers 338 via second destination response paths 362. Similar to the application destination synthesizers 326, the application source synthesizers 338 can include various protocols. Thus, the destination responses are sent to application source synthesizers 338 corresponding to the appropriate protocol that needs to have an application-layer response synthesized.

Data diodes 332 prevent transfer of the destination responses to the source side of the one-way router 300. The application source synthesizers 338 selectively generate and transmit, to the sender 342 via first synthetic source application response path 364, synthetic source application responses responsive to an application-layer of the destination responses and formatted as though originating from the network traffic sources 318. The sender 342 transmits, to the corresponding network traffic destinations 346 via the second synthetic source application response path 366, the synthetic source application-layer responses from the application source synthesizers 338 and, via fourth network traffic path 344, the network traffic passed through data diodes 332.

Thus, network traffic flows from the network traffic sources 318, through the one-way router 300, to the network traffic destinations 346. The network traffic sources 318 receive synthesized responses from the one-way router 300 acknowledging the network traffic flow as though the network traffic had been received by network traffic destinations 346. The one-way router 300 acknowledges destination responses from the network traffic destinations 346 as though the acknowledgement had come from the network traffic sources 318. However, bidirectional data flow through the one-way router is prevented.

As illustrated in FIG. 3, many sets of application destination/source synthesizers 326/338, and their corresponding data diodes 332, can be implemented. Further, multiple data connections and sessions can be supported for each set of synthesizers 326/338. Accordingly, although each data diode is illustrated as providing a single one-way path, the one-way router 300 supports connections and data transfers of the form of many-to-many. Thus, the one-way router 300 is not limited to one-to-one or one-to-many applications, and provides flexibility in the use and configuration of multiple synthesizers and data diodes.

Figure 4:
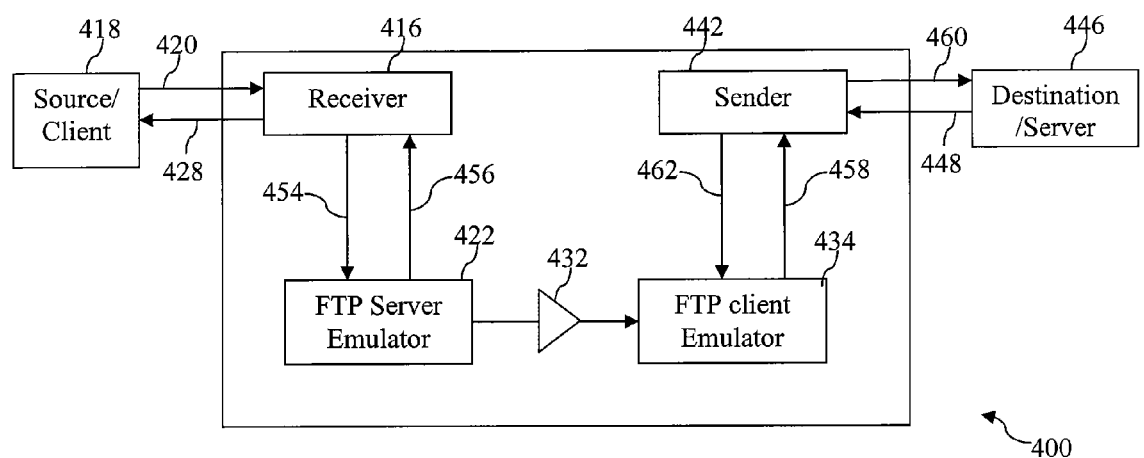
FIG. 4 illustrates a detailed view of an internal architecture and protocol implementation of another embodiment of a one-way router.

FIG. 4 is a schematic diagram of an internal architecture and protocol implementation of another embodiment of one-way router 400. For example, one-way router 400 implements a typical FTP protocol by including FTP server/client emulators 422 and 434. The FTP session begins with a three-way TCP handshake, continues with the FTP connection establishment, authentication of the user, and finally various FTP commands are sent and processed. At each point during an FTP session, a typical FTP source/client 418 expects responses from the destination/server 446 and will abort if the responses are not received. However, data diodes 432 prevent destination/server 446 responses from reaching the source/client 418. If such bidirectionality were allowed, each of the destination/server responses would be an opportunity for inappropriate data transfer and are therefore prevented by one-way network devices such as the one-way router 400.

Regarding source/client 418 authentication to an FTP destination/server 446, after sending the user credentials to the destination/server 446, the source/client 418 expects the destination/server 446 to return a status code indicating whether authentication succeeded. In the one-way router, this response is provided by a protocol synthesizer such as the FTP server emulator 422 and/or the receiver 416, allowing the FTP session to continue. The response can be automatically generated by the one-way router 400 regardless of the actual response from the destination/server 446, even if the authentication might have failed. Thus, the source/client 418 can be instructed that the FTP authentication succeeded, because the one-way router 400 gracefully handles this aspect of unidirectional network traffic flow.

The lifetime of a packet in the one-way router 400 will now be described in greater detail with reference to FIG. 4 and its associated conceptual data pathways. An incoming packet is received from source/client 418 by receiver 416 on an incoming interface via first network traffic path 420. The receiver 416 reads and decodes the packet, and runs an appropriate application layer handler. The handler run by receiver 416 returns an appropriate packet to the source/client 418 (e.g., ACK for TCP; ECHOREPLY for ICMP) via synthetic destination response path 428. The handler of receiver 416 then passes the packet to an appropriate application layer handler over, e.g., a unix socket or other mechanism via second network traffic path 454. The appropriate application layer handler is illustrated in FIG. 4 as provided by FTP server emulator 422.

The application layer handler (FTP server emulator 422) unpacks the packet's header and payload, interprets the packet's payload, and sends a response back to receiver 416 via synthetic destination application response path 456. The receiver 416 stores the packet and sends the packet to source/client 418 via synthetic destination response path 428. The receiver 416 receives ACK from source/client 418 in acknowledgment of the packet, and the receiver 416 removes the stored packet from the receiver upon receiving the acknowledgment. The application layer handler (FTP server emulator 422) passes the packet's header and payload through the data diode 432 (e.g., implemented using SIPC as described above with reference to FIG. 2) to FTP client emulator 434.

The FTP client emulator 434 synthesizes a destination session and passes the associated packets to sender 442 via third network traffic path 458. The sender 442 sends outgoing packets to destination/server 446 via fourth network traffic path 460, storing the packets at the sender 442 and waiting for acknowledgment from destination/server 446 to remove the stored packets. The destination/server 446 responds via first destination response path 448. The data is received by the sender 442, and passed to the application layer client emulator (FTP client emulator 434) via second destination response path 462. The FTP client emulator 434 responds appropriately through sender 442. Finally, the sender 442 sends additional outgoing packets of network traffic to the destination/server 446 via fourth network traffic path 460.

The following example illustrates further details of an exemplary FTP session and types of data passed between the various components of the one-way router 400 in synthesizing an FTP session between a client and server, with reference to FIG. 4. Responses can include exemplary placeholder language such as "foo," "blah," or "<something>," to illustrate the types of responses that can be received or generated, although particular responses and language can be used. Such particular responses can be customized to vary according to the needs of the FTP client and server.

Figure 5:
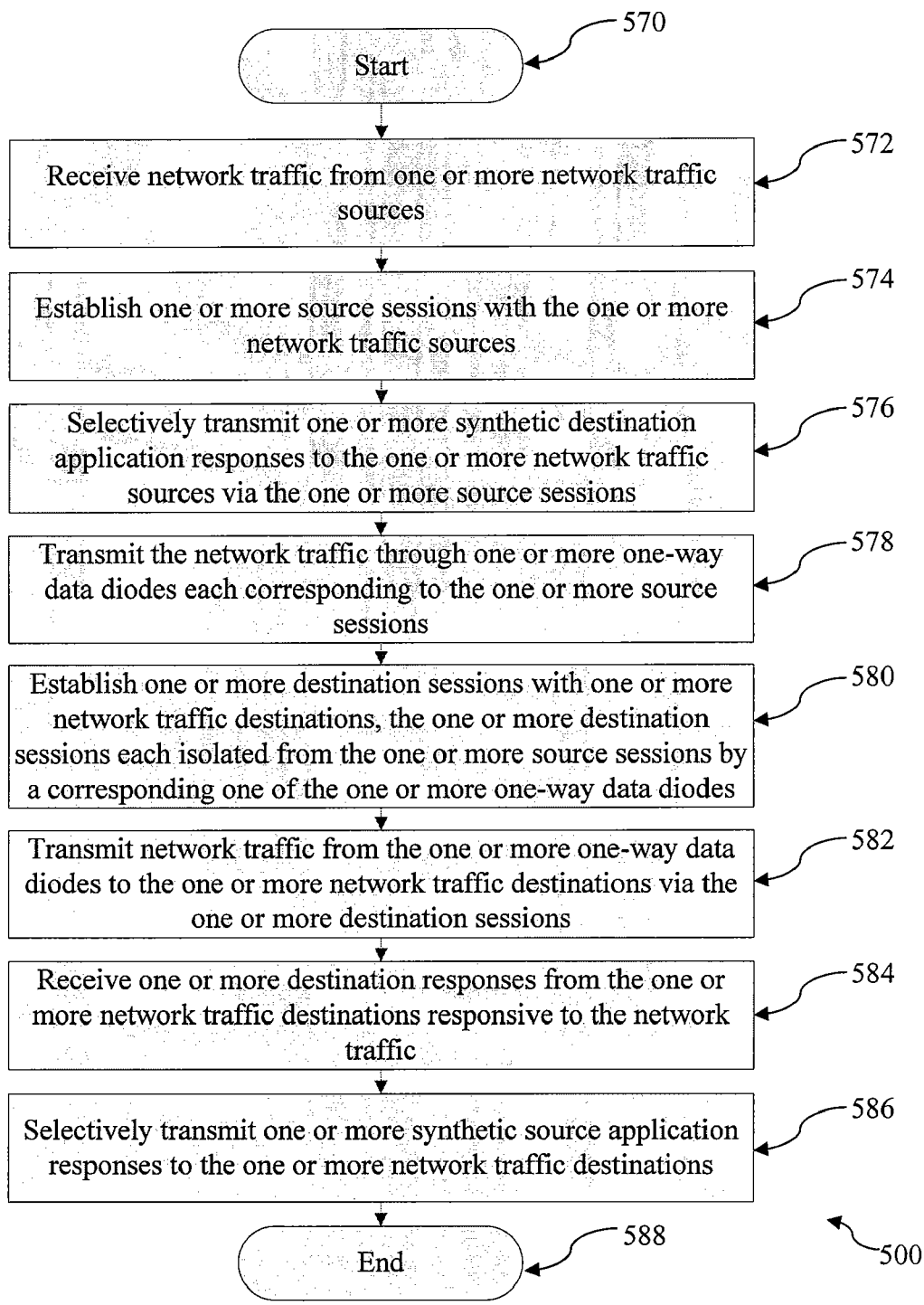
FIG. 5 illustrates a flowchart implementing steps of routing network traffic using an embodiment of a one-way router.

Example Operation of an FTP Session 1. client 418 initiates connection
2. server emulator 422 responds "FTP 200"
3. client 418 responds "USER foo"
4. server emulator 422 responds <something>
5. client 418 responds "PASS blah"
6. server emulator 422 responds "FTP 230—Welcome"
7. server emulator 422 sends login credentials and destination address to client emulator 434
   a. client emulator 434 creates connection to destination 446
   b. client emulator 434 sends credentials to destination 446
   c. client emulator 434 determines whether authentication was successful, marks connection as dead if not
8. client 418 sends "PORT <addr><port>"
   a. server emulator 422 creates a connection through the receiver 416 to <addr>:<port>
9. server emulator 422 sends "FTP 200"
10. client 418 sends "LIST"
11. server emulator 422 sends "FTP 150"—a notification that transfer is to be expected
12. server emulator 422 sends directory listing to addr:port through receiver 416
13. client 418 sends "CWD/foo"
14. server emulator 422 sends "FTP 250 CWD Successful" to client 418
15. server emulator 422 sends CWD command to client emulator 434
    a. client emulator 434 sends CWD to destination 446 if connection is still alive
16. client 418 sends "TYPE bin"
17. server emulator 422 sends TYPE command to client emulator 434
    a. client emulator 434 sends TYPE command to destination 446 through sender 442
18. server emulator 422 sends "200 Type set to I" to client 418
19. client 418 sends "PORT <addr><port>"
    a. server emulator 422 creates connection to addr:port
20. server emulator 422 sends "FTP 200"
21. client 418 sends "STOR foo"
22. server emulator 422 sends command to client emulator 434
    a. if connection is dead do nothing
    b. client emulator 434 sends "PORT <addr><port>"
    c. server 446 sends "FTP 200"
       i. server 446 creates connection to <addr><port>
       ii. sender 442 receives connection and sends data to client emulator 434
    d. client emulator 434 sends "STOR foo"
    e. server 446 sends "FTP 150" to indicate it is ready for transfer
23. server emulator 422 responds to client 418 with "FTP 150"
24. server emulator 422 accepts data off <addr><port>connection
    a. stores the file off if doing comprehensive scanning
    b. scans each packet if doing deep packet inspection
25. server emulator 422 forwards data to client emulator 434 through data diode 432
26. client emulator 434 sends data to <addr><port>to server 446
27. server emulator 422 sends "FTP 226" if transfer was successful
28. server 446 sends "FTP 226" to client emulator 434 if transfer was successful FIG. 5 is a flowchart explaining implementing steps of routing network traffic using an embodiment of a one-way router 500, starting at step 570. At step 572, the one-way router 500 receives network traffic from one or more network traffic sources. At step 574, one or more source sessions with the one or more network traffic sources are established. At step 576, one or more synthetic destination application responses are selectively transmitted to the one or more network traffic sources via the one or more source sessions. At step 578, the network traffic is transmitted through one or more one-way data diodes each corresponding to the one or more source sessions.

Step 580 illustrates establishing one or more destination sessions with one or more network traffic destinations, the one or more destination sessions each isolated from the one or more source sessions by a corresponding one of the one or more one-way data diodes. Step 582 illustrates transmitting network traffic from the one or more one-way data diodes to the one or more network traffic destinations via the one or more destination sessions. Step 584 illustrates receiving one or more destination responses from the one or more network traffic destinations responsive to the network traffic. Step 586 illustrates selectively transmitting one or more synthetic source application responses to the one or more network traffic destinations. Step 588 illustrates the end of the steps associated with one-way router 500 of FIG. 5.

Figure 6:
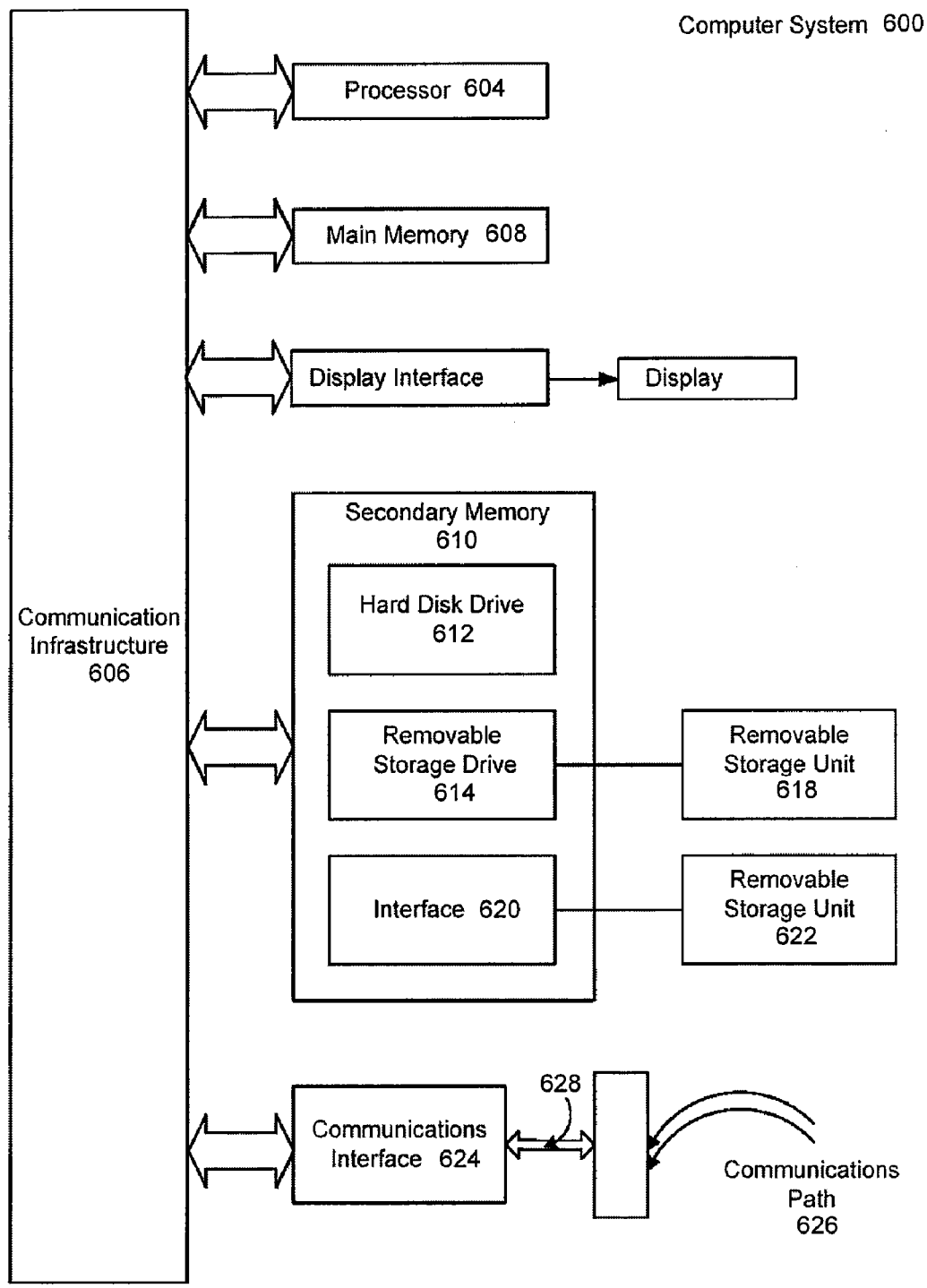
FIG. 6 illustrates a diagram of an example computer system.

FIG. 6 is a schematic diagram of an example computer system 600. Various aspects of the present invention can be implemented by software, firmware, hardware, or a combination thereof. FIG. 6 illustrates an example computer system 600 in which an embodiment of the present invention, or portions thereof, can be implemented as computer-readable code. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a tangible computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (e.g., an Ethernet card), a communications port, a PCMCIA slot and card, or the like. Software and data transferred via communications interface 624 are in the form of signals 628 which may be electronic, electromagnetic, optical, or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, a hard disk installed in hard disk drive 612, and signals 628. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement embodiments of the present invention as discussed herein, such as the one-way router described above. In particular, the computer programs, when executed, enable processor 604 to implement the processes of embodiments of the present invention. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

CONCLUSION

Various systems and methods for implementing one-way routing, and applications thereof, have been described in detail herein. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Furthermore, although aspects of the present invention have been described with reference to SELinux, the invention is not limited to the Linux operating system or SELinux. Based on the description contained herein, a person skilled in the relevant art(s) will appreciate that embodiments of the present invention can be implemented with regard to other operating systems.

What is claimed is:

1. A system for routing network traffic, comprising:
a receiver configured to receive and process network traffic from one or more network traffic sources, the receiver comprising one or more transport destination synthesizers configured to selectively generate one or more synthetic destination transport responses;
one or more application destination synthesizers configured to receive the network traffic from the receiver and selectively transmit to the receiver one or more synthetic destination application responses, the receiver being configured to transmit the one or more synthetic destination application responses to the one or more network traffic sources;
one or more data diodes, each of which is coupled to a corresponding one of the one or more application destination synthesizers and configured to selectively provide one-way passage of the network traffic from the corresponding one of the one or more application destination synthesizers;
one or more application source synthesizers corresponding to the one or more application destination synthesizers, each of the one or more application source synthesizers coupled to a corresponding one of the one or more data diodes and configured to receive the network traffic from the one or more data diodes; and
a sender configured to receive the network traffic from the one or more application source synthesizers, the sender comprising one or more transport source synthesizers configured to selectively generate one or more synthetic source transport responses,
wherein the sender is further configured to (i) transmit the one or more synthetic source transport responses to the one or more network traffic destinations, (ii) receive one or more destination responses from the corresponding one or more network traffic destinations, and (iii) transmit the one or more destination responses to the one or more application source synthesizers,
wherein the one or more application source synthesizers are further configured to selectively generate and transmit, to the sender, one or more synthetic source application responses, and
wherein the sender is further configured to transmit, to the corresponding one or more network traffic destinations, the network traffic and the one or more synthetic source application responses from the one or more application source synthesizers.

2. The system of claim 1, wherein the one or more synthetic destination transport responses are responsive to a transport-layer of the network traffic and formatted as though originating from the one or more network traffic destinations to establish one or more source sessions with the one or more network traffic sources.

3. The system of claim 1, wherein the one or more synthetic destination application responses are responsive to an application-layer of the network traffic and formatted as though originating from the one or more network traffic destinations.

4. The system of claim 1, wherein the one or more synthetic source transport responses are responsive to a transport-layer of the network traffic and formatted as though originating from one or more network traffic sources to establish one or more destination sessions with the one or more network traffic destinations.

5. The system of claim 1, wherein the one or more synthetic source application responses are responsive to an application-layer of the one or more destination responses and formatted as though originating from the one or more network traffic sources.

6. The system of claim 1, wherein the receiver and the one or more application destination synthesizers comprise a receiver network stack, and the sender and the one or more application source synthesizers comprise a sender network stack.

7. The system of claim 6, wherein the receiver network stack further comprises a receiver TCP/IP stack and the sender network stack further comprises a sender TCP/IP stack.

8. The system of claim 6, further comprising one or more additional network stacks, configured to interface with one or more additional networks, and corresponding to at least one of (i) the receiver network stack and (ii) the sender network stack.

9. The system of claim 1, wherein the one or more synthetic destination transport responses and the one or more synthetic source transport responses are responsive to a network-layer of the network traffic.

10. The system of claim 1, wherein the system is configured to appear transparent to the one or more network traffic sources and the one or more network traffic destinations.

11. The system of claim 10, wherein the system is configured to appear transparent from network to application layers in a TCP/IP stack.

12. The system of claim 1, wherein the one or more data diodes are implemented using at least one of (i) one or more software diodes and (ii) one or more hardware diodes.

13. The system of claim 1, wherein the system is configured to allow support of chat traffic and streaming of multimedia network traffic.

14. A method of routing network traffic, comprising:
generating, at a first component, a synthetic destination transport response based on network traffic received from a network traffic source;
generating, at the first component, a synthetic destination application response based on the network traffic;
sending, from the first component, the synthetic destination application response to the network traffic source;
generating, at a second component, a synthetic source transport response based on the network traffic received via the first component using a coupling that allows only one-way communication from the first component;
sending, from the second component, the generated synthetic source transport response to a network traffic destination;
receiving, at the second component, a destination response from the network traffic destination;
generating, at the second component, a synthetic source application response based on the received destination response; and
sending, from the second component, the generated synthetic source application response to the network traffic destination.

15. The system of claim 1, wherein the synthetic destination transport responses are responsive to a transport-layer of the network traffic and formatted as though originating from the one or more network traffic destinations to establish one or more source sessions with the one or more network traffic sources.

16. The method of claim 14, wherein the synthetic destination application response is responsive to an application-layer of the network traffic and formatted as though originating from the network traffic destination.

17. The method of claim 14, wherein the synthetic source transport response is responsive to a transport-layer of the network traffic and formatted as though originating from the network traffic source to establish a destination session with the network traffic destination.

18. The method of claim 14, wherein the synthetic source application response is responsive to an application-layer of the destination response and formatted as though originating from the network traffic source.

19. The method of claim 14, wherein the coupling that only allows one-way communication from the first component uses a diode.

20. A non-transitory computer-readable medium having stored thereon, computer-executable instructions that, if executed by a computing device, cause the computing device to perform a method for routing network traffic, comprising:
generating, at a first component, a synthetic destination transport response based on network traffic received from a network traffic source;
generating, at the first component, a synthetic destination application response based on the network traffic;
sending, from the first component, the synthetic destination application response to the network traffic source;
generating, at a second component, a synthetic source transport response based on the network traffic received via the first component using a coupling that only allows one-way communication from the first component;
sending, from the second component, the generated synthetic source transport response to a network traffic destination;
receiving, at the second component, a destination response from the network traffic destination;
generating, at the second component, a synthetic source application response based on the received destination response; and
sending, from the second component, the generated synthetic source application response to the network traffic destination.

* * * * *